(12) United States Patent
Sun et al.

(10) Patent No.: US 10,794,698 B2
(45) Date of Patent: Oct. 6, 2020

(54) METHOD AND APPARATUS FOR INDICATING DIRECTION

(71) Applicant: HUAWEI TECHNOLOGIES CO., LTD., Shenzhen (CN)

(72) Inventors: Rui Sun, Shenzhen (CN); Teng Zhang, Shanghai (CN); Yi Pan, Shanghai (CN); Renzhi Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 15/779,092

(22) PCT Filed: Nov. 26, 2015

(86) PCT No.: PCT/CN2015/095696
§ 371 (c)(1),
(2) Date: May 25, 2018

(87) PCT Pub. No.: WO2017/088149
PCT Pub. Date: Jun. 1, 2017

(65) Prior Publication Data
US 2018/0356225 A1     Dec. 13, 2018

(51) Int. Cl.
*G01C 17/28*   (2006.01)
*G01C 17/32*   (2006.01)
(Continued)

(52) U.S. Cl.
CPC ............ *G01C 17/28* (2013.01); *G01C 17/32* (2013.01); *G01C 17/38* (2013.01);
(Continued)

(58) Field of Classification Search
CPC ........ G01C 17/28; G01C 17/30; G01C 17/32; G01C 17/38
(Continued)

(56) References Cited

U.S. PATENT DOCUMENTS 5,173,709 A * 12/1992 Lauro .................. G01C 17/30
                                                    33/349
5,435,070 A *  7/1995 Kilian ................. G01C 17/28
                                                    324/247
(Continued)

FOREIGN PATENT DOCUMENTS

CA      2750975 A1 *  8/2012  ............ G01C 17/38
CN      1642183 A      7/2005
(Continued)

OTHER PUBLICATIONS

Bonekamp H:"Digital compass", Elektor electronics, DB, vol. 22, No. 247, on Sep. 1, 1996, pp. 52-55, XP000633181.
(Continued)

*Primary Examiner* — Christopher W Fulton
(74) *Attorney, Agent, or Firm* — Kilpatrick Townsend & Stockton LLP

(57) ABSTRACT

Embodiments of the present invention disclose a method and system for indicating a direction. The method is executed by a mobile terminal, and includes: determining an orientation of a screen of the mobile terminal; determining any direction in four directions east, south, west, and north of a location of the mobile terminal; determining another direction based on the determined direction when the screen of the mobile terminal is determined to be downward, so that directions for every 90° are respectively the east, the north, the west, and the south in a clockwise direction; and displaying all the determined directions on the screen of the mobile terminal. By using the solutions in the embodiments, a user can obtain a correct direction indication even when holding the mobile terminal non-horizontally, so that accuracy of the direction indication of the mobile terminal is improved.

22 Claims, 3 Drawing Sheets

(51) Int. Cl.
*G01C 17/38* (2006.01)
*H04M 1/725* (2006.01)
(52) U.S. Cl.
CPC ........ *H04M 1/72519* (2013.01); *H04M 1/725* (2013.01); *H04M 2250/12* (2013.01)
(58) Field of Classification Search
USPC ......... 33/272, 301, 303, 334, 348, 349, 351, 33/352, 356, 363 R, 363 K
See application file for complete search history.

(56) References Cited

U.S. PATENT DOCUMENTS

| | | | | |
|---|---|---|---|---|
| 6,141,881 | A * | 11/2000 | Ayres | G01C 17/28 33/352 |
| 6,529,828 | B1 * | 3/2003 | Williams | G01C 21/20 701/457 |
| 2002/0104224 | A1 * | 8/2002 | Barker | G01C 17/20 33/355 R |
| 2007/0276625 | A1 * | 11/2007 | Hikida | G01C 17/28 702/152 |
| 2010/0312510 | A1 * | 12/2010 | Piemonte | G01C 17/28 702/93 |
| 2011/0066363 | A1 | 3/2011 | Kimishima | |
| 2011/0090244 | A1 | 4/2011 | Pantfoerder | |
| 2012/0072155 | A1 | 3/2012 | Kadokura | |
| 2012/0203486 | A1 * | 8/2012 | Almalki | G01C 17/28 702/96 |
| 2013/0057571 | A1 | 3/2013 | Harris | |
| 2015/0089823 | A1 * | 4/2015 | Garrone | G01C 17/28 33/303 |
| 2016/0187134 | A1 * | 6/2016 | Kimishima | G01C 17/28 33/356 |

FOREIGN PATENT DOCUMENTS

| | | |
|---|---|---|
| CN | 201114220 Y | 9/2008 |
| CN | 102168974 A | 8/2011 |
| CN | 202074978 U | 12/2011 |
| CN | 102422125 A | 4/2012 |
| CN | 104536567 A | 4/2015 |
| CN | 104596510 A | 5/2015 |
| DE | 2351655 A1 | 4/1975 |
| JP | 2009264918 A | 11/2009 |
| JP | 2010038743 A | 2/2010 |
| JP | 2013011552 A | 1/2013 |
| RU | 2526470 C2 | 3/2011 |
| WO | 1994012853 A1 | 6/1994 |

OTHER PUBLICATIONS

GOST 7.83-2001,International Standard—The system of standards for information, libraryand publishing—Electronic Editions—Basic views and output,dated Jul. 1, 2002,total 16 pages with 19 pages English translation.

* cited by examiner

METHOD AND APPARATUS FOR INDICATING DIRECTION

CROSS-REFERENCE TO RELATED APPLICATIONS

This application is a national stage of International Application No. PCT/CN2015/095696, filed on Nov. 26, 2015, which is hereby incorporated by reference in its entirety.

TECHNICAL FIELD

The present invention relates to the field of communications technologies, and in particular, to a method and an apparatus for indicating a direction.

BACKGROUND

Currently, a smartphone is generally provided with a compass function, and locations of directions east, south, west, and north are indicated by using a two-dimensional (2D) dial displayed on a screen of a mobile phone. By using the compass function, a user can know a specific direction of a location to which the smartphone currently points, for example, 260° west. However, the smartphone needs to be held horizontally when the compass function is used, and when the screen is downward, the direction cannot be indicated correctly.

SUMMARY

The present invention provides a method and system for indicating a direction, so that a user can obtain a correct direction indication when a screen is either upward or downward.

Specific technical solutions in embodiments of the present invention are as follows:

According to a first aspect, an embodiment of the present invention provides a method for indicating a direction, executed by a mobile terminal, including: determining an orientation of a screen of the mobile terminal and any direction in four directions east, south, west, and north of a location of the mobile terminal; determining another direction based on the determined any direction in the four directions east, south, west, and north when the screen of the mobile terminal is determined to be downward, so that directions for every 90° are respectively the east, the north, the west, and the south in a clockwise direction; and displaying all the determined directions on the screen of the mobile terminal.

In this embodiment of the present invention, when the screen is determined to be downward, the mobile terminal determines a direction indication different from that determined when the screen is upward, so as to resolve a prior-art problem that two directions in four directions are indicated incorrectly when the screen is downward, so that direction indication accuracy is improved.

In a first possible implementation of the first aspect, the mobile terminal determines a location of 90° clockwise rotation to be the west, determines a location of 180° clockwise rotation to be the south, and determines a location of 270° clockwise rotation to be the east based on a determined location of the north direction of the location of the mobile terminal when the screen of the mobile terminal is determined to be downward. After one direction is determined, another direction is determined by appointing a relationship between the another direction and the direction, so that a result of a logical calculation can be quickly depicted on an interface of an electronic box and needle.

According to a second aspect, an embodiment of the present invention further provides a method for indicating a direction, including: determining an orientation of a screen of a mobile terminal; when the screen of the mobile terminal is determined to be downward, respectively displaying directions east, north, west, and south for every 90° in a clockwise direction on the screen of the mobile terminal, starting with any point on the screen; determining any direction in four directions east, south, west, and north of a location of the mobile terminal, and determining another direction based on the determined direction, so that the directions for every 90° are respectively the east, the north, the west, and the south in a clockwise direction; and displaying all the determined directions on the screen of the mobile terminal.

According to the method provided in this embodiment of the present invention, an orientation of a screen of a display interface is considered when an electronic compass interface is displayed, so that a correct direction indication can be ensured when the screen is downward. This facilitates a requirement of special people, compensates for a disadvantage of an existing electronic compass, and improves direction indication accuracy.

According to a third aspect, an embodiment of the present invention further provides a method for indicating a direction, executed by a mobile terminal, including: determining an orientation of a screen of the mobile terminal; and when the screen of the mobile terminal is determined to be downward currently, using a sum of a first included angle and 180° as a value of a second included angle when an obtained value of the first included angle is within a range of 0°-180°, where the first included angle is an included angle between an X axis and a Z axis that is used as a rotation axis of the mobile terminal; or using a difference between a first included angle and 180° as a value of a second included angle when a value of the first included angle is determined to be within a range of 181°-360°; determining a location at which the value of the second included angle is 0° to be north, a location at which the value of the second included angle is 90° to be east, a location at which the value of the second included angle is 180° to be south, and a location at which the value of the second included angle is 270° to be west; and displaying all the determined directions on the screen of the mobile terminal.

This embodiment of the present invention enables a user to obtain a correct direction indication when the screen is downward, for example, when the user watches a mobile phone while lying down. This compensates for a disadvantage in an existing solution, improves user satisfaction, improves accuracy of the direction indication, and increases usability of an electronic compass product.

In a first possible implementation of the third aspect, when the screen of the mobile terminal is determined to be upward currently, the mobile terminal determines a location at which the obtained value of the first included angle is 0° to be the north, a location at which the value of the first included angle is 90° to be the east, a location at which the value of the first included angle is 180° to be the south, and a location at which the value of the first included angle is 270° to be the west.

This embodiment of the present invention enables the screen to display different direction layouts when facing upward and downward, so as to resolve a prior-art problem that when the screen of the mobile phone is downward, the east and west directions are indicated correctly but the south and north directions are indicated incorrectly, or the south and north directions are indicated correctly but the east and west directions are exchanged, so that direction indication accuracy is improved.

According to a fourth aspect, an embodiment of the present invention further provides an apparatus for indicating a direction, including a display, and further including: an acceleration sensor, configured to determine any direction in directions east, south, west, and north of a location of the apparatus, and determine an orientation of the display; and a processor, configured to: when the display is determined to be downward, instruct the display to respectively display directions east, north, west, and south for every 90° in a clockwise direction, starting with any point on the display; determine another direction based on the direction determined by using the acceleration sensor, so that the directions for every 90° are respectively the east, the north, the west, and the south in a clockwise direction; and instruct the display to display all the determined directions. This apparatus is corresponding to the method embodiment of the first aspect. When the screen is determined to be downward, a direction indication different from that determined when the screen is upward is determined, so as to resolve a prior-art problem that two directions in four directions are indicated incorrectly when the screen is downward, so that direction indication accuracy is improved.

According to a fifth aspect, an embodiment of the present invention further provides an apparatus for indicating a direction, including a display, and further including: an acceleration sensor, configured to determine any direction in directions east, south, west, and north of a location of the apparatus, and determine an orientation of the display; and a processor, configured to: when the display is determined to be downward, instruct the display to respectively display directions east, north, west, and south for every 90° in a clockwise direction, starting with any point on the display; determine another direction based on the direction determined by using the acceleration sensor, so that the directions for every 90° are respectively the east, the north, the west, and the south in a clockwise direction; and instruct the display to display all the determined directions. This embodiment is corresponding to the foregoing embodiment of the second aspect. An orientation of a screen of a display interface is considered when an electronic compass interface is displayed, so that a correct direction indication can be ensured when the screen is downward. This facilitates a requirement of special people, compensates for a disadvantage of an existing electronic compass, and improves direction indication accuracy.

According to a sixth aspect, an embodiment of the present invention further provides an apparatus for indicating a direction, including a display, and further including: an acceleration sensor, configured to determine an orientation of the display, and obtain a value of a first included angle between a Z axis and an X axis of the apparatus at a current location; and a processor, configured to use a sum of the first included angle and 180° as a value of a second included angle when the value of the first included angle is determined to be within a range of 0°-180°; or use a difference between a first included angle and 180° as a value of a second included angle when a value of the first included angle is determined to be within a range of 181°-360°; determine a location at which the value of the second included angle is 0° to be north, a location at which the value of the second included angle is 90° to be east, a location at which the value of the second included angle is 180° to be south, and a location at which the value of the second included angle is 270° to be west; and instruct the display to display all the determined directions. This embodiment is corresponding to the foregoing method embodiment of the third aspect. A user is enabled to obtain a correct direction indication when the screen is downward, for example, when the user watches a mobile phone while lying down. This compensates for a disadvantage in an existing solution, improves user satisfaction, improves accuracy of the direction indication, and increases usability of an electronic compass product.

In addition, the embodiments of the present invention further provide an apparatus for indicating a direction and a computer program product including program code. The apparatus and the code execute the foregoing method embodiments, and have beneficial effects corresponding to the foregoing method embodiments.

DESCRIPTION OF EMBODIMENTS

The embodiments of the present invention provide a method and system for indicating a direction, so that a direction can be indicated correctly when a smartphone is not held in a horizontal plane, for example, when a screen is downward.

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", and so on (if they exist) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

A compass is a simple instrument for distinguishing a direction, and is also referred to as a north arrow. A predecessor of the compass is a south-pointing ladle, which is one of the four great inventions of ancient China. A major constituent part is a magnetic needle that is mounted on a shaft and that can rotate freely. The magnetic needle can remain in a tangential direction of a magnetic meridian under an action of the geomagnetic field, and a north pole of the magnetic needle points to the geographic north pole. This performance can be used to identify a direction. The compass is usually used in fields such as navigation, geodetic surveying, travel, and military.

Figure 1:
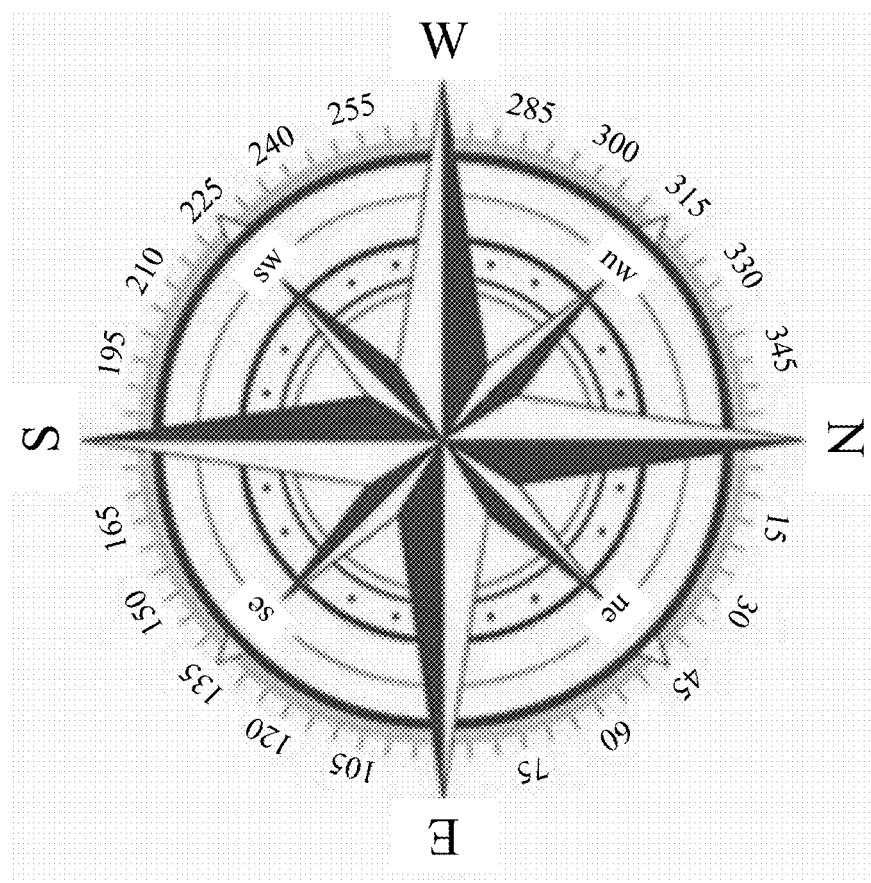
FIG. 1 is an electronic compass interface according to an embodiment of the present invention, where a prior art compass is used to represent the compass interface.

Currently, most mobile terminals can already provide an electronic compass function, so that directions east, south, west, and north of a current location are indicated on a screen of a mobile phone by using a 2D dial, so as to provide direction information for a user of the mobile terminal. Referring to FIG. 1, FIG. 1 is an example of an electronic compass interface on a mobile terminal. The electronic compass interface includes four directions east, south, west, and north, and angles within a range of 360°. When a user rotates the mobile terminal, a direction displayed on the electronic compass interface rotates as well, so as to ensure a correct direction indication for the user. An electronic compass is also referred to as an electronic box and needle. Generally, the electronic box and needle can be implemented by using two types of materials: one is a Hall material, and the other is a magnetic resistance material. In simple terms, a Hall principle is that when a constant current passes through a conductor, a lateral voltage of the conductor varies linearly with magnetic induction intensity. A value of the magnetic induction intensity can be measured by measuring a voltage of a mobile phone. It can be assumed that the geomagnetic field is parallel to the ground level. If two such Hall devices are placed vertically in a plane of the mobile phone, a component of magnetic induction intensity of the geomagnetic field on the two Hall devices can be perceived, so that a direction of the geomagnetic field is obtained. This is similar to force decomposition. The magnetic resistance material is characterized in that resistance varies with variation of the magnetic induction intensity. The magnetic resistance material can be used to constitute a bridge, and magnetic induction intensity in a single direction can be measured by measuring a voltage between two nodes of the bridge. Similarly, a direction of the magnetic field can be measured by placing two bridges that are perpendicular to each other in the mobile terminal. After the direction of the magnetic field is measured, the east, the south, the west, and the north can be determined. However, when a magnetic sensor in the mobile terminal tilts, a magnetic flux that passes through the magnetic sensor changes. This causes an error in direction pointing. However, compensation for a tilt of the electronic compass can be performed by using a principle that a tilt angle can be measured by using an acceleration sensor. Therefore, the direction of the magnetic field can be measured in three-dimensional space in combination with a gravity (acceleration) sensor.

The following briefly describes sensors used in the embodiments of the present invention, and all these sensors are the prior art. An acceleration sensor is also referred to as a G-sensor, and returns acceleration values in three directions: a horizontal direction x of the screen, y (perpendicular to the horizontal direction of the screen), and z (perpendicular to a plane direction of the screen). A left-right direction of the mobile phone is an x axis, a top-down direction is a y axis, and a direction that is perpendicular to the screen is a z axis. The values are affected by gravity, and are in unit of m/s^2. When the mobile phone is placed horizontally on a table top, the x axis is 0 by default, the y axis is 0 by default, and the z axis is 9.81 by default. When the mobile phone is placed downward on the table top, the z axis is −9.81. When the mobile phone tilts to the left, the x axis is a positive value. When the mobile phone tilts to the right, the x axis is a negative value. When the mobile phone tilts upward, the y axis is a negative value. When the mobile phone tilts downward, the y axis is a positive value.

A gravity sensor is referred to as a GV-sensor for short, and outputs gravity data. On the earth, a gravity value is 9.8, in unit of m/s^2. A coordinate system is the same as that of the acceleration sensor. When a device is reset, output of the gravity sensor is the same as that of the acceleration sensor.

A linear acceleration sensor is referred to as an LA-sensor for short. The linear acceleration sensor is an acceleration sensor that obtains data from which gravity influence is subtracted. The data is in unit of m/s^2. A coordinate system is the same as that of the acceleration sensor.

An orientation sensor is referred to as an O-sensor for short, and returns angle data in three axes. Direction data is in unit of degree. To obtain accurate angle data, an electronic compass sensor E-compass needs to obtain data of the G-sensor and generate data of the O-sensor by calculation. Otherwise, only an angle in the horizontal direction can be obtained. The orientation sensor provides three pieces of data: azimuth, pitch, and roll. The azimuth is an included angle between the magnetic north pole and the Y axis returned when the mobile phone is placed horizontally, and the included angle is within a range of 0° to 360°, where 0°=North, 90°=East, 180°=South, and 270°=West. The pitch is an included angle between the x axis and the horizontal plane, and the included angle is within a range of −180° to 180°. When the z axis rotates to the y axis, the angle is a positive value. The roll is an included angle between the y axis and the horizontal plane, and the included angle is within a range of −90° to 90° due to a historical reason. When the x axis moves to the z axis, the angle is a positive value.

An orientation mentioned in the embodiments of the present invention includes two orientations: upward and downward. Upward is a direction that is far away from the center of the earth, and downward is a direction pointing to the center of the earth.

Figure 2:
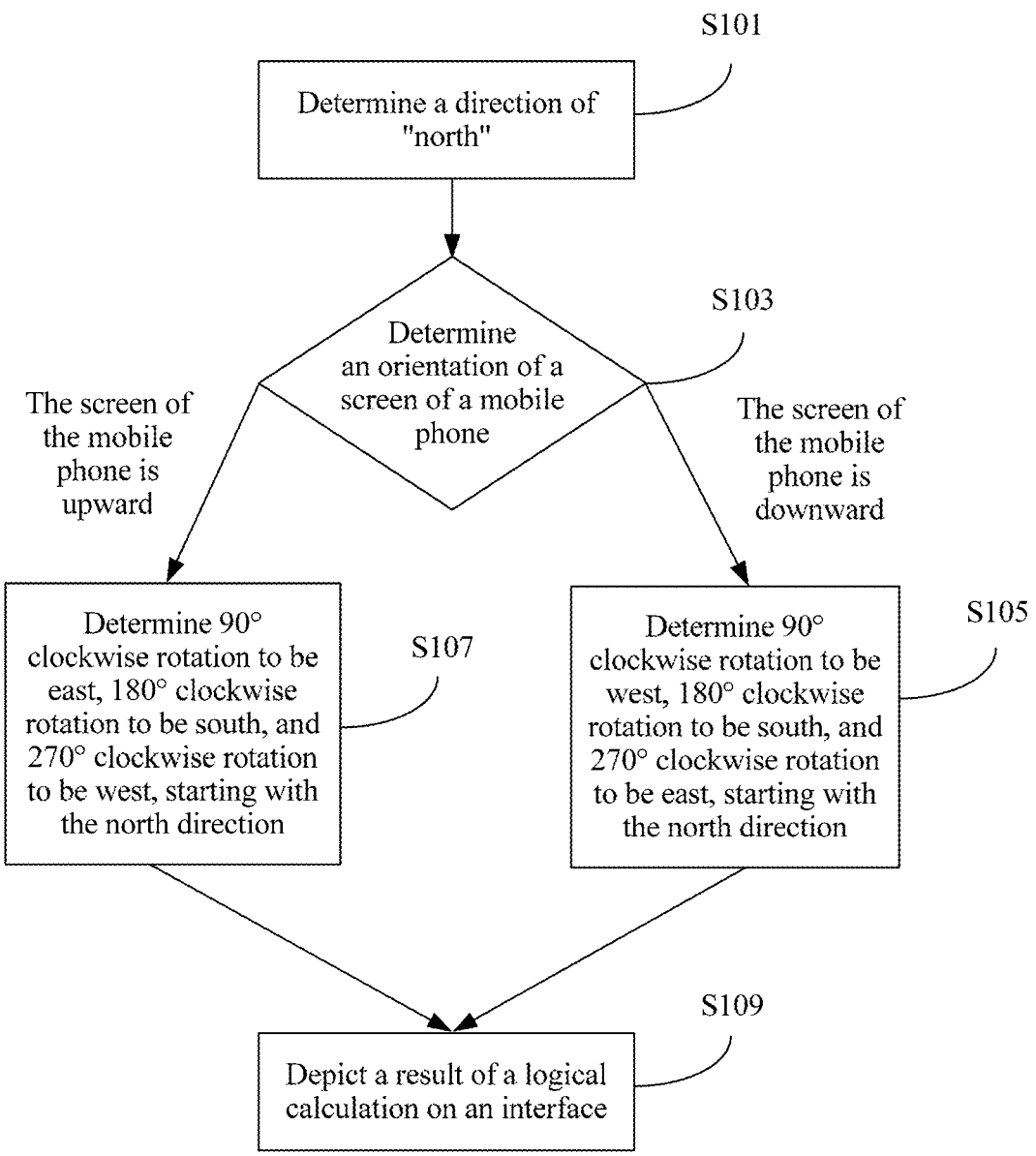
FIG. 2 is a schematic diagram of a method embodiment for indicating a direction according to an embodiment of the present invention.

An embodiment of the present invention provides a method for indicating a direction. Referring to FIG. 2, FIG. 2 is a schematic flowchart of a method for indicating a direction disclosed in an embodiment of the present invention. As shown in FIG. 2, the method for indicating a direction may include the following steps:

S101. Determine a direction of "north". Specifically, any direction in four directions east, south, west, and north of a location of a mobile terminal is determined. This step is the prior art, and is not described herein.

S103. Determine an orientation of a screen of a mobile phone. This step can be implemented by using the above mentioned sensors, and is also the prior art. However, it should be noted that an execution sequence of steps S101 and S103 may be that step S101 is performed before step S103; or step S103 is performed before step S101; or the two steps are performed at the same time.

S105. When the screen of the mobile phone is determined to be downward, determine 90° clockwise rotation to be the west, 180° clockwise rotation to be the south, and 270° clockwise rotation to be the east, starting with the determined north direction. Similarly, if the south, the west, or the north is determined in step S101, other three directions are determined based on the determined direction, so that specifically, directions for every 90° are respectively the east, the north, the west, and the south in a clockwise direction, starting with the determined direction. For example, if the west is determined, the other three directions are determined by starting with the west direction, so that 90° clockwise rotation is the south, 180° clockwise rotation is the east, and 270° clockwise rotation is the north.

S107. When the screen of the mobile phone is determined to be upward, determine 90° clockwise rotation to be the east, 180° clockwise rotation to be the south, and 270° clockwise rotation to be the west, starting with the determined north direction. Similar to step S105, if the south, the west, or the north is determined in step S101, other three directions are determined based on the determined direction, so that specifically, directions for every 90° are respectively the east, the south, the west, and the north in a clockwise direction, starting with the determined direction. For example, if the east is determined, the other three directions are determined by starting with the east direction, so that 90° clockwise rotation is the south, 180° clockwise rotation is the west, and 270° clockwise rotation is the north.

S109. Depict a result of a logical calculation on an interface. That is, the above determined directions are displayed on a display interface of the mobile terminal.

The orientation of the screen of the mobile terminal is considered when an electronic compass interface is depicted, so that a user of the mobile terminal can obtain a correct direction indication even when the screen is downward, for example, when the user is lying down. This is convenient for use by a user, and improves direction indication accuracy.

Figure 3:
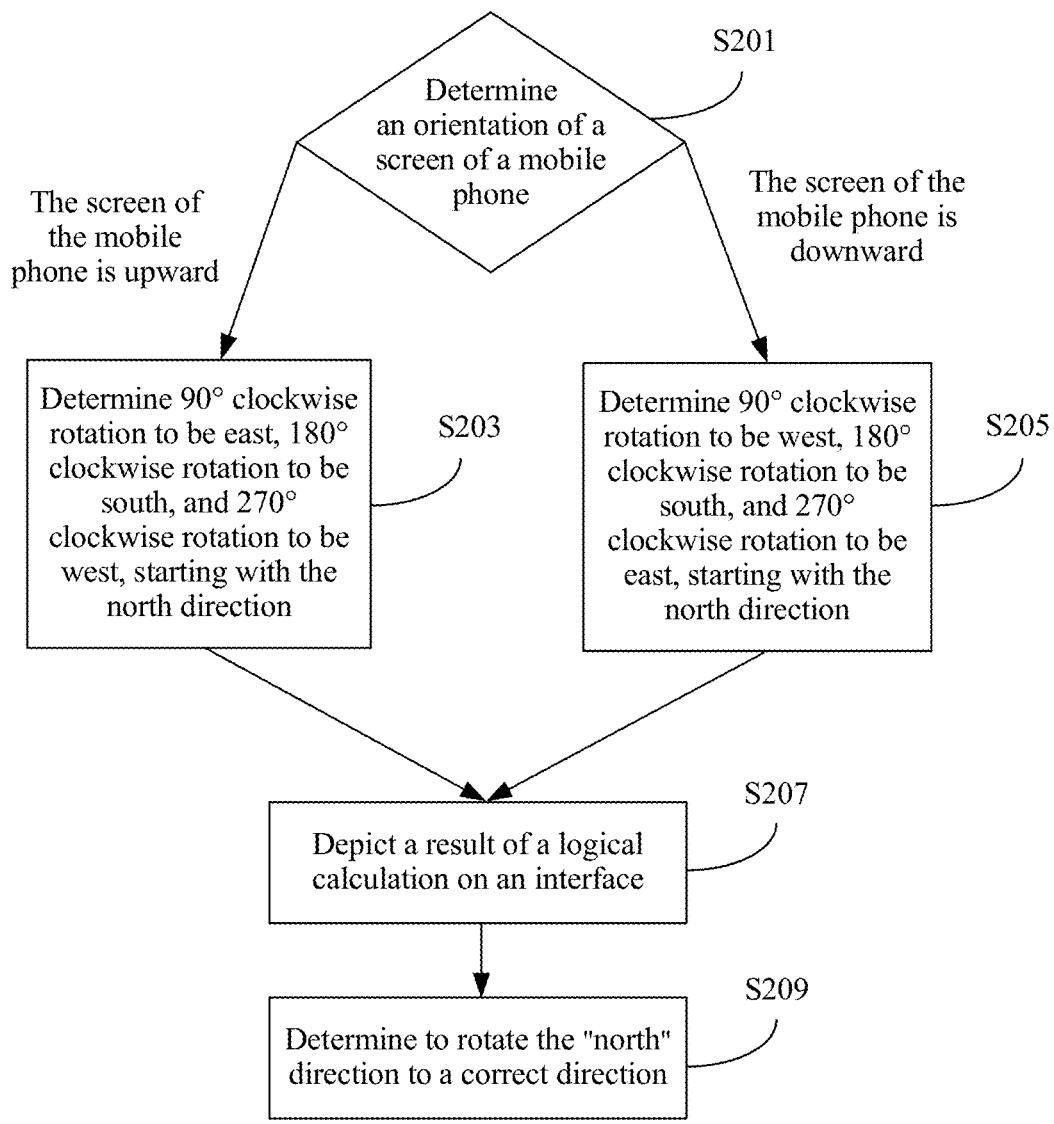
FIG. 3 is a schematic diagram of another method embodiment for indicating a direction according to an embodiment of the present invention.

An embodiment of the present invention further provides a method for indicating a direction. Referring to FIG. 3, FIG. 3 is a schematic flowchart of another method for indicating a direction disclosed in an embodiment of the present invention. As shown in FIG. 3, the method for indicating a direction may include the following steps:

S201. Determine an orientation of a screen of a mobile phone. This step can be implemented by using the above mentioned sensors, and is also the prior art. This step is the same as step S103.

S203. When the screen of the mobile phone is determined to be upward, use any point on the screen as a location of a north direction, and determine 90° clockwise rotation to be east, 180° clockwise rotation to be south, and 270° clockwise rotation to be west, starting with the north direction.

S205. When the screen of the mobile phone is determined to be downward, use any point on the screen as a location of a north direction, and determine 90° clockwise rotation to be west, 180° clockwise rotation to be south, and 270° clockwise rotation to be east, starting with the north direction.

S207. Depict a result of a logical calculation on an interface. That is, the above determined directions are displayed on a display interface of the mobile terminal. This step is the same as S109.

S209. Rotate the "north" direction to a correct direction. Specifically, any direction, for example, the north, of a current location of the mobile terminal is determined, and then the north direction displayed on the display interface is aligned with the determined north. From a perspective of a user, an electronic box and needle on the display interface of the mobile terminal rotates and points to the correct direction after stopping rotating. Certainly, another direction other than the north of the mobile terminal can also be determined, and then a direction on the display interface is aligned with the another direction. For example, the east direction is determined, and the east on the display interface is rotated to the determined east direction.

This embodiment of the present invention provides another method for implementing a correct direction indication. The orientation of the screen of the mobile terminal is also considered when a direction is indicated. Therefore, a user of the mobile terminal can obtain a correct direction indication when the screen is downward. This is convenient for use by a user, and improves direction indication accuracy.

An embodiment of the present invention further provides a method for indicating a direction. The method specifically includes:

determining an orientation of a screen of a mobile terminal; and when the screen of the mobile terminal is determined to be downward currently:

determining a range of an obtained value of a first included angle, where the first included angle is an included angle between a Z axis and an X axis of the mobile terminal, and can be obtained from a sensor such as an acceleration sensor; using a sum of the first included angle and 180° as a value of a second included angle if the value of the first included angle is determined to be within a range of 0°-180°; or using a difference between the first included angle and 180° as a value of a second included angle if the value of the first included angle is determined to be within a range of 181°-360°; and determining a location at which the value of the second included angle is 0° to be north, a location at which the value of the second included angle is 90° to be east, a location at which the value of the second included angle is 180° to be south, and a location at which the value of the second included angle is 270° to be west; alternatively, when the value of the first included angle is determined to be within a range of 0°-180°, using a sum of the first included angle and 180° as the value of the first included angle; or when the value of the first included angle is determined to be within a range of 181°-360°, using a difference between the first included angle and 180° as the value of the first included angle; and determining a location at which the value of the first included angle is 0° to be north, a location at which the value of the first included angle is 90° to be east, a location at which the value of the first included angle is 180° to be south, and a location at which the value of the first included angle is 270° to be west; and displaying all the determined directions on the screen of the mobile terminal.

In addition, when the screen of the mobile terminal is determined to be upward currently, a location at which the value of the first included angle is 0° is determined to be the north, a location at which the value of the first included angle is 90° is determined to be the east, a location at which the value of the first included angle is 180° is determined to be the south, and a location at which the value of the first included angle is 270° is determined to be the west. Alternatively, the obtained value of the first included angle may be assigned to the second included angle, and a location at which the value of the first included angle is 0° is determined to be the north, a location at which the value of the first included angle is 90° is determined to be the east, a location at which the value of the first included angle is 180° is determined to be the south, and a location at which the value of the first included angle is 270° is determined to be the west.

This embodiment of the present invention is the same as the foregoing two method embodiments. Different upward and downward scenarios of the screen of the mobile terminal are treated differently, so as to resolve a prior-art problem that a direction is displayed incorrectly when the screen is downward, so that a user of the mobile terminal can obtain a correct direction indication when the screen is downward. This is convenient for use by a user, and improves direction indication accuracy.

An embodiment of the present invention further provides an apparatus for indicating a direction. The apparatus is specifically configured to implement the foregoing method embodiments, and may specifically include:

a display, configured to display an interface of an electronic box and needle, that is, various correct directions of a current location of the apparatus;

a sensor, configured to obtain various sensor data, so as to determine any direction in directions east, south, west, and north of a location of the apparatus, and to determine whether the display is upward or downward; and a processor, configured to determine another direction based on the determined any direction in the four directions east, south, west, and north of the location of the mobile apparatus when the display is determined to be downward, so that directions for every 90° are respectively the east, the north, the west, and the south in a clockwise direction; and instruct the display to display all the determined directions. The processor is further configured to determine another direction based on the determined any direction in the four directions east, south, west, and north of the location of the mobile terminal when the display is determined to be upward, so that directions for every 90° are respectively the east, the south, the west, and the north in a clockwise direction. Specifically, for example, when a screen of the mobile terminal is determined to be downward, the processor determines a location of 90° clockwise rotation to be the west, determines a location of 180° clockwise rotation to be the south, and determines a location of 270° clockwise rotation to be the east based on a determined location of the north direction of the location of the mobile terminal; or determines a location of 90° clockwise rotation to be the north, determines a location of 180° clockwise rotation to be the west, and determines a location of 270° clockwise rotation to be the south based on a determined location of the east direction; or determines a location of 90° clockwise rotation to be the east, determines a location of 180° clockwise rotation to be the north, and determines a location of 270° clockwise rotation to be the west based on a determined location of the south direction. Similarly, when the display is determined to be upward, the processor determines a location of 90° clockwise rotation to be the east, determines a location of 180° clockwise rotation to be the south, and determines a location of 270° clockwise rotation to be the west based on a determined location of the north direction of the location of the mobile terminal; or determines a location of 90° clockwise rotation to be the south, determines a location of 180° clockwise rotation to be the west, and determines a location of 270° clockwise rotation to be the north based on a determined location of the east direction of the location of the mobile terminal; or determines a location of 90° clockwise rotation to be the west, determines a location of 180° clockwise rotation to be the north, and determines a location of 270° clockwise rotation to be the east based on a determined location of the south direction of the location of the mobile terminal; or determines a location of 90° clockwise rotation to be the north, determines a location of 180° clockwise rotation to be the east, and determines a location of 270° clockwise rotation to be the south based on a determined location of the east direction of the location of the mobile terminal.

According to the apparatus for indicating a direction provided in this embodiment of the present invention, the orientation of the screen of the mobile terminal is considered when an electronic compass interface is depicted, so that a user of the mobile terminal can obtain a correct direction indication even when the screen is downward, for example, when the user is lying down. This is convenient for use by a user, and improves direction indication accuracy.

An embodiment of the present invention further provides an apparatus for indicating a direction. The apparatus is specifically configured to implement the foregoing method embodiments, and may specifically include a display, a sensor, and a processor. Functions of the display and the sensor are the same as those of the display and the sensor in the previous apparatus embodiment. A difference lies in a function of the processor. Specifically:

The display is configured to display an interface of an electronic box and needle, that is, various correct directions of a current location of the apparatus.

The sensor is configured to obtain various sensor data, so as to determine any direction in directions east, south, west, and north of a location of the apparatus, and to determine whether the display is upward or downward.

The processor is configured to: when the display is determined to be downward, instruct the display to respectively display directions east, north, west, and south for every 90° in a clockwise direction, starting with any point on the display; determine another direction based on the direction determined by using the acceleration sensor, so that the directions for every 90° are respectively the east, the north, the west, and the south in a clockwise direction; and instruct the display to display all the determined directions.

A difference between this apparatus embodiment and the previous apparatus embodiment is that an interface of an electronic box and needle displays any direction in an initial display, and the any direction is probably an incorrect direction. However, the any direction is quickly replaced by a correct direction, and a user can see an image that the electronic box and needle rotates to the correction direction. This embodiment implements that a direction can be indicated correctly when the screen is either upward or downward, so that direction indication accuracy can be improved. In addition, the user can see a dynamic rotation process from an initial direction to a correct direction. This is closer to an actual physical compass and can improve user experience.

An embodiment of the present invention further provides an apparatus for indicating a direction. The apparatus is specifically configured to implement the foregoing method embodiments, and may specifically include a display, a sensor, and a processor. Functions of the display and the sensor are the same as those of the display and the sensor in the previous apparatus embodiment. A difference lies in a function of the processor. Specifically:

The display is configured to display an interface of an electronic box and needle, that is, various correct directions of a current location of the apparatus.

The sensor is configured to obtain various sensor data, so as to determine any direction in directions east, south, west, and north of a location of the apparatus, and to determine whether the display is upward or downward.

The processor is configured to obtain, from the sensor, a value of a first included angle between a Z axis and an X axis of the apparatus at a current location; use a sum of the first included angle and 180° as a value of a second included angle when the value of the first included angle is determined to be within a range of 0°-180°; or use a difference between a first included angle and 180° as a value of a second included angle when a value of the first included angle is determined to be within a range of 181°-360°; determine a location at which the value of the second included angle is 0° to be the north, a location at which the value of the second included angle is 90° to be the east, a location at which the value of the second included angle is 180° to be the south, and a location at which the value of the second included angle is 270° to be the west; and instruct the display to display all the determined directions. Alternatively, when the value of the first included angle is determined to be within a range of 0°-180°, a sum of the first included angle and 180° is used as the value of the first included angle; or when the value of the first included angle is determined to be within a range of 181°-360°, a difference between the first included angle and 180° is used as the value of the first included angle; and a location at which the value of the first included angle is 0° is determined to be the north, a location at which the value of the first included angle is 90° is determined to be the east, a location at which the value of the first included angle is 180° is determined to be the south, and a location at which the value of the first included angle is 270° is determined to be the west.

In addition, when the screen of the mobile terminal is determined to be upward currently, a location at which the value of the first included angle is 0° is determined to be the north, a location at which the value of the first included angle is 90° is determined to be the east, a location at which the value of the first included angle is 180° is determined to be the south, and a location at which the value of the first included angle is 270° is determined to be the west. Alternatively, the obtained value of the first included angle may be assigned to the second included angle, and a location at which the value of the first included angle is 0° is determined to be the north, a location at which the value of the first included angle is 90° is determined to be the east, a location at which the value of the first included angle is 180° is determined to be the south, and a location at which the value of the first included angle is 270° is determined to be the west.

This embodiment of the present invention is the same as the foregoing two apparatus embodiments. Different upward and downward scenarios of the screen of the mobile terminal are treated differently, so as to resolve a prior-art problem that a direction is displayed incorrectly when the screen is downward, so that a user of the mobile terminal can obtain a correct direction indication when the screen is downward. This is convenient for use by a user, and improves direction indication accuracy.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The mobile terminal in all the foregoing embodiments of the present invention may be various terminals such as a mobile phone, a tablet computer, and a smart camera, and is not specifically limited herein.

It may be clearly understood by persons skilled in the art that, for the purpose of convenient and brief description, for a detailed working process of the foregoing apparatus, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the technical solutions in the embodiments of the present invention are implemented in the form of a software functional unit and sold or used as an independent product, the technical solutions may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for indicating a direction, executed by a mobile terminal, comprising:
   determining an orientation of a screen of the mobile terminal;
   determining any direction in four directions east, south, west, and north of a location of the mobile terminal;
   determining another direction based on the determined any direction in the four directions east, south, west, and north of the location of the mobile terminal when the screen of the mobile terminal is determined to be downward, so that directions for every 90° are respectively the east, the north, the west, and the south in a clockwise direction; and
   displaying all the determined directions on the screen of the mobile terminal.

2. The method according to claim 1, wherein before the displaying all the determined directions on the screen of the mobile terminal, the method further comprises:
   determining another direction based on the determined any direction in the four directions east, south, west, and north of the location of the mobile terminal when the screen of the mobile terminal is determined to be upward, so that directions for every 90° respectively the east, the south, the west, and the north in a clockwise direction.

3. The method according to claim 2, wherein the determining another direction based on the determined any direction in the four directions east, south, west, and north of the location of the mobile terminal when the screen of the mobile terminal is determined to be upward, so that directions for every 90° are respectively the east, the south, the west, and the north in a clockwise direction is specifically:
determining a location of 90° clockwise rotation to be the east, determining a location of 180° clockwise rotation to be the south, and determining a location of 270° clockwise rotation to be the west based on a determined location of the north direction of the location of the mobile terminal when the screen of the mobile terminal is determined to be upward.

4. The method according to claim 1, wherein the determining another direction based on the determined any direction in the four directions east, south, west, and north of the location of the mobile terminal when the screen of the mobile terminal is determined to be downward, so that directions for every 90° are respectively the east, the north, the west, and the south in a clockwise direction is specifically:
determining a location of 90° clockwise rotation to be the west, determining a location of 180° clockwise rotation to be the south, and determining a location of 270° clockwise rotation to be the east based on a determined location of the north direction of the location of the mobile terminal when the screen of the mobile terminal is determined to be downward.

5. The method according to claim 1, wherein the determining an orientation of a screen of the mobile terminal and the determining any direction in four directions east, south, west, and north of a location of the mobile terminal specifically comprise:
determining the orientation of the screen of the mobile terminal first, and then determining any direction in the four directions east, south, west, and north of the location of the mobile terminal; or
determining any direction in the four directions east, south, west, and north of the location of the mobile terminal first, and then determining the orientation of the screen of the mobile terminal.

6. The method according to claim 1, wherein the determining any direction in four directions east, south, west, and north of a location of the mobile terminal is specifically:
determining, by using an acceleration sensor on the mobile terminal, any direction in the four directions east, south, west, and north of the location of the mobile terminal.

7. The method according to claim 1, wherein the determining an orientation of a screen of the mobile terminal is specifically: determining, by using the acceleration sensor on the mobile terminal, whether the screen of the mobile terminal is upward or downward.

8. A computer program product, comprising program code, wherein when a computer runs the program code, the program code executes the method according to claim 1.

9. A method for indicating a direction, executed by a mobile terminal, comprising:
determining an orientation of a screen of the mobile terminal;
when the screen of the mobile terminal is determined to be downward, respectively displaying directions east, north, west, and south for every 90° in a clockwise direction on the screen of the mobile terminal, starting with any point on the screen;
determining any direction in four directions east, south, west, and north of a location of the mobile terminal, and determining another direction based on the determined direction, so that the directions for every 90° are respectively the east, the north, the west, and the south in a clockwise direction; and
displaying all the determined directions on the screen of the mobile terminal.

10. The method according to claim 9, wherein before the displaying all the determined directions on the screen of the mobile terminal, the method further comprises:
when the screen of the mobile terminal is determined to be upward, respectively displaying the directions east, south, west, and north for every 90° in a clockwise direction on the screen of the mobile terminal, starting with any point on the screen; and
determining any direction in the four directions east, south, west, and north of the location of the mobile terminal, and determining another direction based on the determined direction, so that the directions for every 90° are respectively the east, the south, the west, and the north in a clockwise direction.

11. The method according to claim 9, wherein the respectively displaying directions east, north, west, and south for every 90° in a clockwise direction on the screen of the mobile terminal, starting with any point on the screen specifically comprises:
respectively displaying the directions north, west, south, and east for every 90° in a clockwise direction, starting with a 12 o'clock location of the screen of the mobile terminal.

12. The method according to claim 9, wherein the determining any direction in four directions east, south, west, and north of a location of the mobile terminal, and determining another direction based on the determined direction, so that the directions for every 90° are respectively the east, the north, the west, and the south in a clockwise direction is specifically:
determining a location of the north direction of the location of the mobile terminal, and respectively determining locations of the directions for every 90° in a clockwise direction to be the west, the south, and the east, starting with the location of the north direction.

13. The method according to claim 9, wherein the determining any direction in four directions east, south, west, and north of a location of the mobile terminal is specifically:
determining, by using an acceleration sensor on the mobile terminal, any direction in the four directions east, south, west, and north of the location of the mobile terminal.

14. The method according to claim 9, wherein the determining an orientation of a screen of the mobile terminal comprises: determining, by using the acceleration sensor on the mobile terminal, whether the screen of the mobile terminal is upward or downward.

15. An apparatus for indicating a direction, comprising a display, and further comprising:
a sensor, configured to determine any direction in directions east, south, west, and north of a location of the apparatus, and determine an orientation of the display; and
a processor, configured to determine another direction based on the determined any direction in the four directions east, south, west, and north of the location of the apparatus when the display is determined to be downward, so that directions for every 90° are respectively the east, the north, the west, and the south in a clockwise direction; and instruct the display to display all the determined directions.

16. The apparatus according to claim 15, wherein:
the processor is further configured to determine another direction based on the determined any direction in the four directions east, south, west, and north of the location of the terminal when the display is determined to be upward, so that directions for every 90° are respectively the east, the south, the west, and the north in a clockwise direction.

17. The apparatus according to claim 16, wherein the processor is specifically configured to:
determine a location of 90° clockwise rotation to be the east, determine a location of 180° clockwise rotation to be the south, and determine a location of 270° clockwise rotation to be the west based on a determined location of the north direction of the location of the terminal when a screen of the terminal is determined to be upward.

18. The apparatus according to claim 15, wherein the processor is specifically configured to:
determine a location of 90° clockwise rotation to be the west, determine a location of 180° clockwise rotation to be the south, and determine a location of 270° clockwise rotation to be the east based on a determined location of the north direction of the location of the terminal when a screen of the terminal is determined to be downward.

19. An apparatus for indicating a direction, comprising a display, and further comprising:
a sensor, configured to determine any direction in directions east, south, west, and north of a location of the apparatus, and determine an orientation of the display; and
a processor, configured to: when the display is determined to be downward, instruct the display to respectively display directions east, north, west, and south for every 90° in a clockwise direction, starting with any point on the display; determine another direction based on the direction determined by using the sensor, so that the directions for every 90° are respectively the east, the north, the west, and the south in a clockwise direction; and instruct the display to display all the determined directions.

20. The apparatus according to claim 19, wherein the processor is further configured to:
when a screen of the mobile terminal is determined to be upward, instruct the display to respectively display the directions east, south, west, and north for every 90° in a clockwise direction, starting with any point on the display; determine another direction based on the direction determined by using the sensor, so that the directions for every 90° are respectively the east, the south, the west, and the north in a clockwise direction; and instruct the display to display all the determined directions.

21. The apparatus according to claim 19, wherein the respectively displaying directions east, north, west, and south for every 90° in a clockwise direction, starting with any point on the display specifically comprises:
respectively displaying the directions north, west, south, and east for every 90° in a clockwise direction, starting with a 12 o'clock location of the display.

22. The apparatus according to claim 19, wherein the determining any direction in directions east, south, west, and north of a location of the apparatus is specifically: determining a location of the north direction of the location of the apparatus; and
the determining another direction based on the direction determined by using the sensor, so that the directions for every 90° are respectively the east, the north, the west, and the south in a clockwise direction is specifically: respectively determining locations of the directions for every 90° in a clockwise direction to be the west, the south, and the east, starting with the location of the north direction determined by using the sensor.

* * * * *